INVENTORS:
WILLIAM A. HUNTER
ROBERT LUND

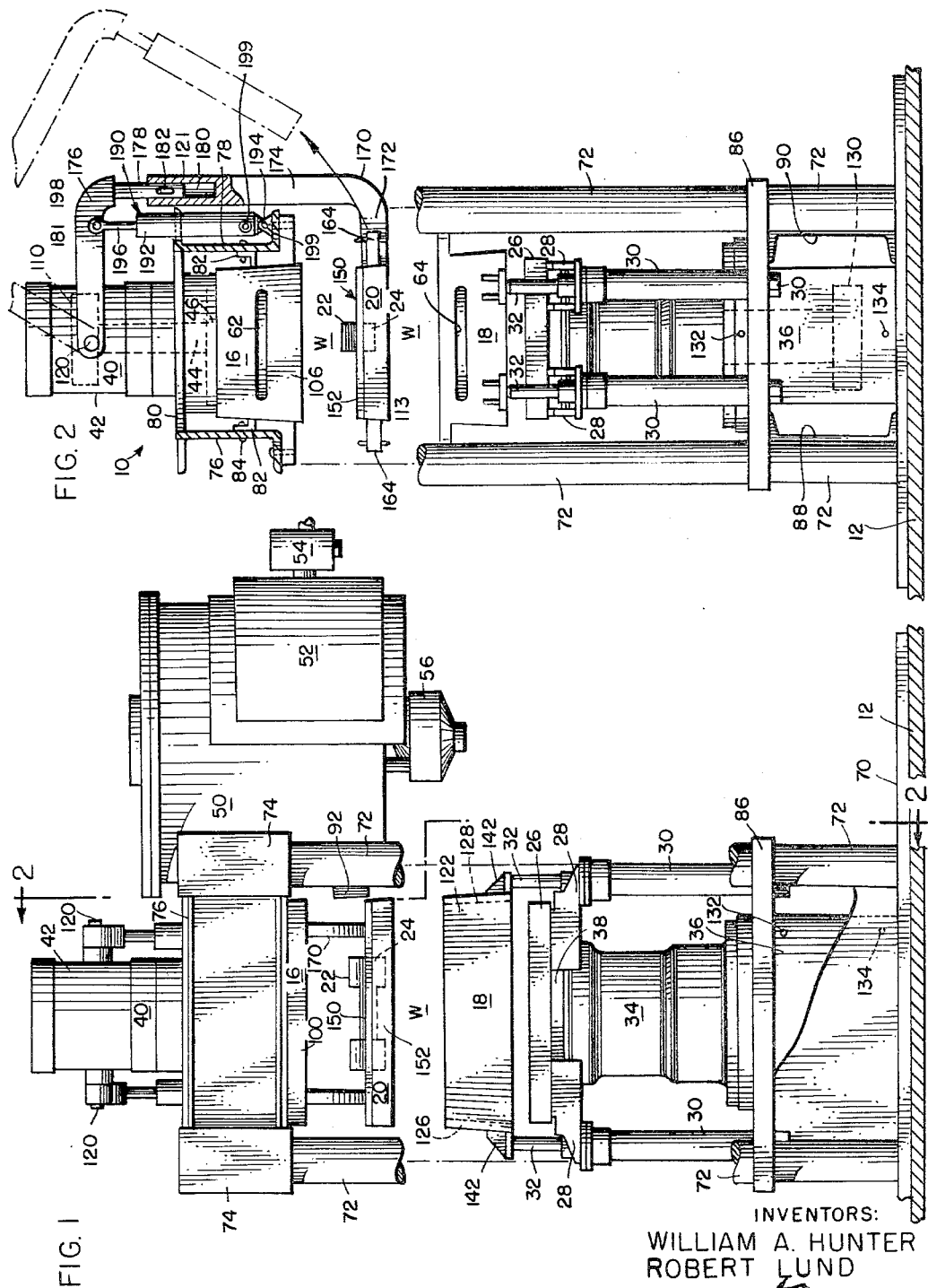
Jan. 18, 1966     W. A. HUNTER ETAL     3,229,336
MATCH PLATE MOLDING MACHINE FOR THE SIMULTANEOUS PRODUCTION
OF COPE AND DRAG MOLD SECTIONS
Filed April 29, 1963     5 Sheets-Sheet 1
INVENTORS:
WILLIAM A. HUNTER
ROBERT LUND
BY
ATT'Y

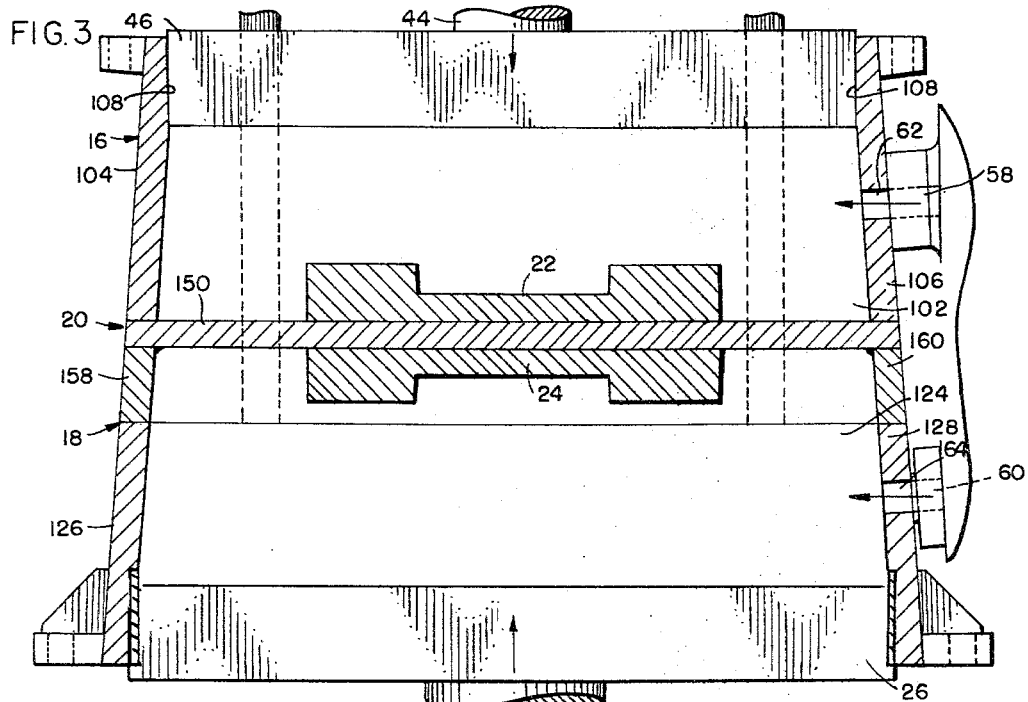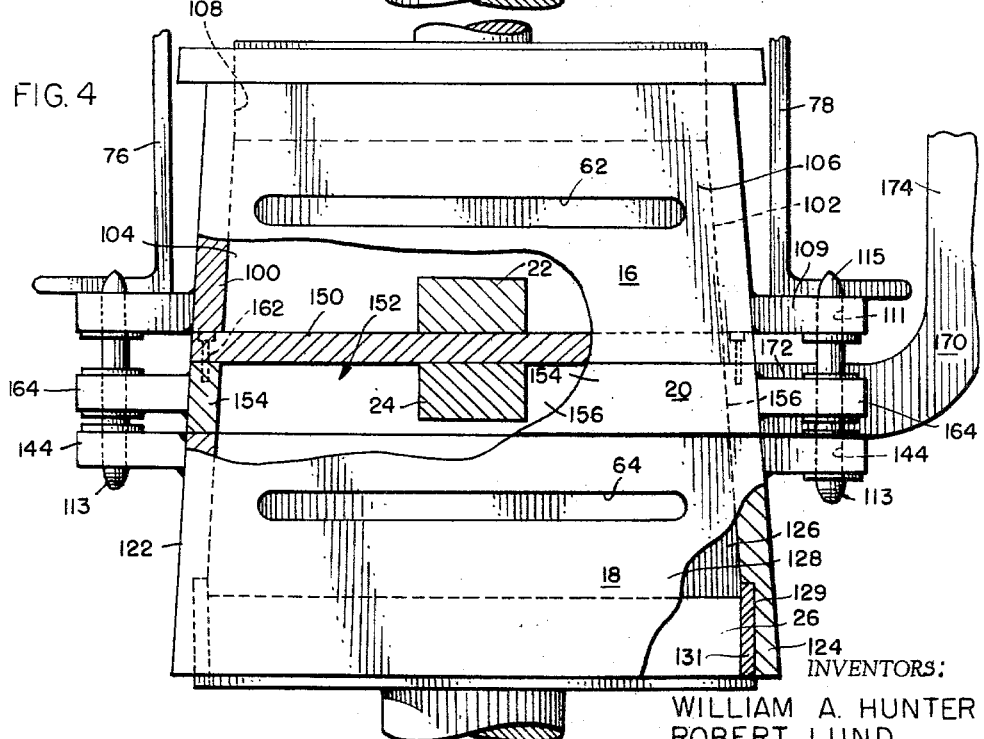

BY

ATT'Y

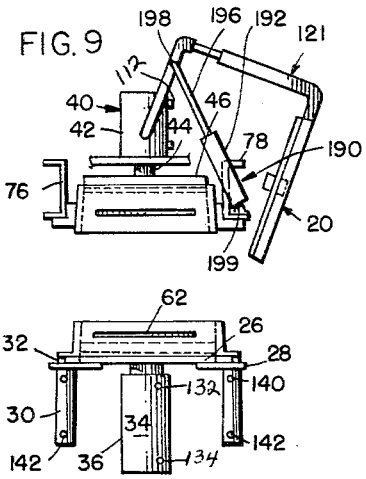
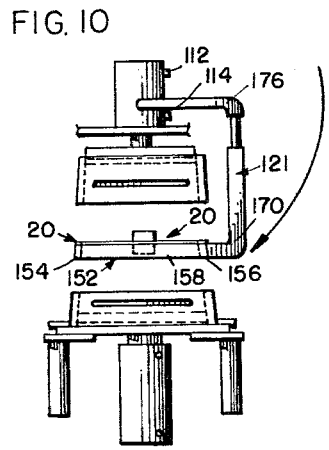
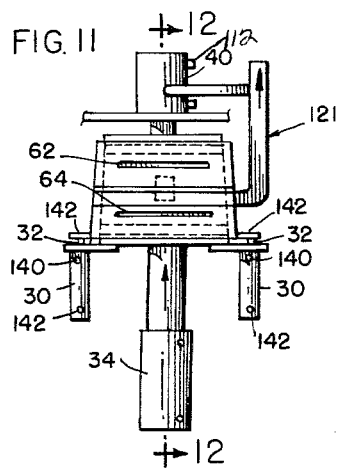
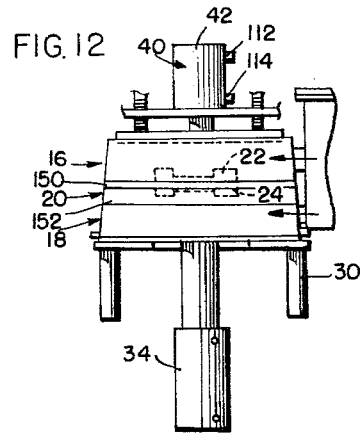
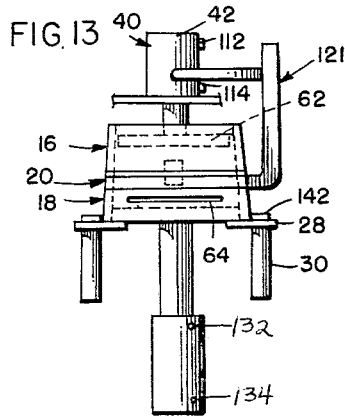
INVENTORS:
WILLIAM A. HUNTER
ROBERT LUND

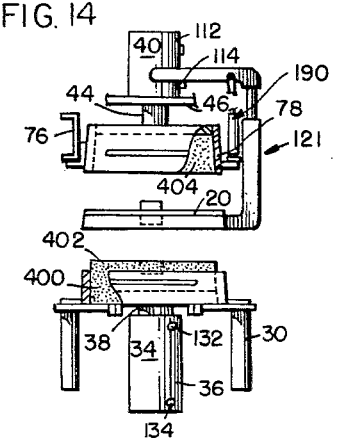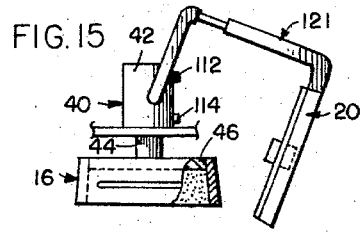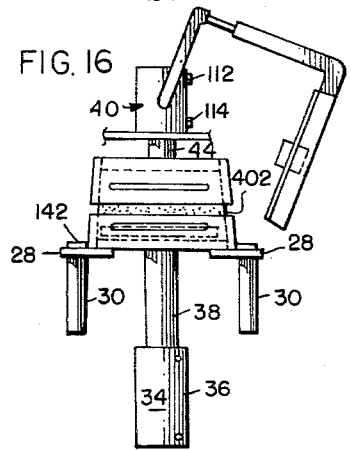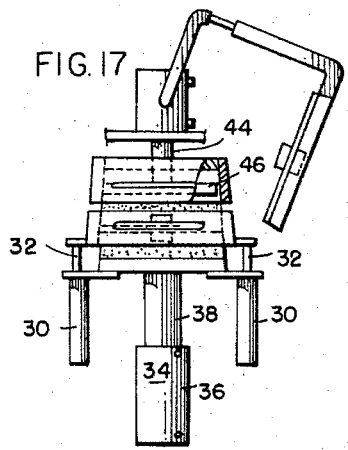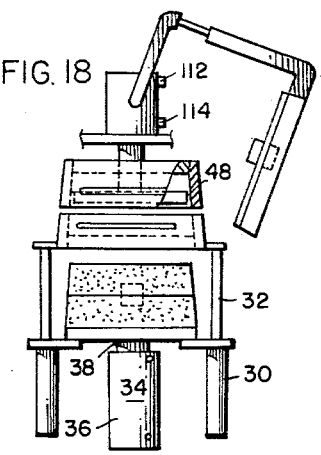

United States Patent Office 3,229,336
Patented Jan. 18, 1966

3,229,336
MATCH PLATE MOLDING MACHINE FOR THE SIMULTANEOUS PRODUCTION OF COPE AND DRAG MOLD SECTIONS
William A. Hunter, Morton Grove, and Robert Lund, Melrose Park, Ill., assignors to Pettibone Mulliken Corporation, Chicago, Ill., a corporation of Delaware
Filed Apr. 29, 1963, Ser. No. 276,479
11 Claims. (Cl. 22—26)

The present invention relates generally to machines for producing sand molds and has particlar reference to a foundry machine which is capable of simultaneously producing the cope and drag sections of a composite sand mold, the two sections being complete and assembled upon each other and ready for a molten metal-pouring operation at the time they leave the machine.

Heretofore, in the production of a foundry sand mold and where there are involved sand-shaping operations utilizing a dual-sided pattern plate, i.e., a match plate, it has invariably been the practice to effect complete sand-filling and sand-compacting operations separately and successively on opposite sides of the pattern-carrying match plate. Ordinarily, in the use of a match plate, it is customary to fill the flask section on one side of the match plate by a sand-pouring operation, then to jolt the sand-filled flask section in order to distribute the sand about the pattern therein, and thereafter, to turn the assembly over and similarly fill and jolt the flask section on the other side of the match plate. After these operations have been completed, the two flask sections, one on each side of the match plate, are subjected to a simultaneous squeeze operation in order to compact the sand in the flask section about the two patterns on the match plate.

Such separate filling and jolting of the flask sections on opposite sides of the match plate have been considered necessary because neither a filling operation nor a jolting operation can be properly performed in connection with the flask section that is upside down. Furthermore, with such separate sand-filling and jolting operations on opposite sides of the match plate, the filling operation has necessarily been a sand-pouring one inasmuch as to resort to the more efficient blowing operation for filling purposes would be to establish unbalanced pressure on opposite sides of the pattern-carrying match plate and cause the plate to bulge or buckle during the blowing operation.

Not only has the problem of match plate buckling discouraged efforts to blow the flask sections which are associated with the match plate, but where the design of a semi-automatic or a fully automatic machine is concerned, practical considerations relating to machine movements, the handling of such machine parts as the flask sections, the pattern-carrying match plate and the squeeze plates, and the design of blow openings and their correlation with the blow plate of the usual sand magazine, have risen to further discourage such efforts.

The present invention contemplates the provision of a fully automatic machine by means of which blow-squeeze functions may be carried out on the flask sections on opposite sides of a match plate in one operation. The production of such machine, wherein the end product involved includes complementary cope and drag mold sections assembled upon each other to produce a finished composite sand mold ready for a molten metal-pouring operation, constitutes the principal and general object of the present invention.

The realization of this object is made possible largely by reason of a vertical in-line arrangement of machine parts and machine motions, which is to say, that all machine operations exclusive of the pattern-placing and pattern-darwing operations take place in a vertical line, i.e., along a vertical axis through the working area of the machine so that no outlying operating stations are required. Since no lateral machine movements, other than the motion or movement of the pattern-carrying match plate during pattern placement and drawing operations, are involved, simplification of machine design and a reduction in the number of moving machine parts are made possible. With fewer moving machine parts, the machine is less likely to get out of order and, thus, maintenance costs are reduced to a minimum.

Another advantage that accrues from such vertical in-line machine operation resides in the increase in the number of mold sections which can be made over a given period of time. With a conventional sand mold-forming machine involving separate fill and jolt operations on opposite sides of the match plate, these operations, successively performed, as well as the turn-over operation in between them, cumulatively are time-consuming. Thus, with fill operations on opposite sides of the match plate taking place simultaneously, and with turn-over operations as well as jolt operations eliminated altogether, the saving in time will allow a shorter machine cycle than has heretofore been possible. Whereas heretofore, a conventional sand mold-forming machine that is designed for the same purpose has been capable of producing one complete composite mold each minute, a machine constructed according to the principles of the present invention has yielded three complete or composite molds each minute.

A further object of the invention is to provide in connection with a sand mold-forming machine of the type under consideration, a novel fluid pressure-actuated sealing means by means of which the blow plate assemblies that are associated with the sand magazine may effectively be sealed to the blow slots in the flask sections undergoing filling with sand, the sealing means becoming automatically effective at the time the flask sections and the magazine are initially brought into blowing register with one another.

A still further object of the invention is to provide, in connection with a sand mold-forming machine, a novel combination of fluid-actuated instrumentalities including respective squeeze plate actuators and a flask-supporting actuator, together with means whereby the operation of the various actuators may be so correlated that predetermined relative flask, pattern plate, squeeze plate, and compacted sand mold movements may take place automatically, the net result of such movements being the production of finished cope and drag mold sections which are closed upon each other for removal in their closed condition from the machine and ready for a metal-pouring operation.

It is another object of the invention to provide in a machine of the character briefly outlined above and for simultaneous dual mold section production and assembly, a novel sequence of machine movements involving a movable squeeze plate which operates at one point in the machine cycle to compact the sand about its associated pattern section in the cope flask section, and at another point in the machine cycle to effect a push-out operation by means of which the compacted sand mold in such flask section, as well as the compacted sand mold in the drag flask section, are both forced simultaneuosly from their respective flask sections.

Still another object of the invention is to provide in a machine of the character under consideration a novel pattern plate support which, during initiation of the clamping operation for the flask sections, allows for vertical shifting of the pattern-carrying match plate to effect proper registry and engagement with the flask sections, and also which, during the blow and squeeze operations, maintains the match plate in a floating condition so that blow and squeeze pressures on opposite sides thereof will be effectively equalized.

Another and important object of the invention is to provide a novel match plate handling mechanism by means of which the match plate may, at the proper time in the machine cycle, be projected into the operating area of the machine and withdrawn therefrom immediately after the pattern draw operation is completed.

Ancillary objects of the invention relating to machine parts and movements are numerous, and principal among them is the provision of a novel sand magazine arrangement by means of which sand may be effectively and simultaneously introduced into the cope and drag flask sections on opposite sides of the match plate.

Numerous other objects and advantages of the invention, not at this time enumerated, will become readily apparent from a consideration of the following detailed description.

In the accompanying five sheets of drawings forming a part of this specification, one illustrative embodiment of the invention has been shown.

In these drawings:

FIG. 1 is a fragmentary front elevational view showing a sand mold-forming machine constructed in accordance with the principles of the present invention and illustrating the parts thereof in the positions which they assume at the commencement of a machine cycle;

FIG. 2 is a sectional view taken on the line 2—2 of FIG. 1 and in the direction indicated by the arrows;

FIG. 3 is an enlarged sectional view taken substantially centrally and vertically through the operating area of the machine during the squeeze portion of the machine cycle;

FIG. 4 is a side elevational view showing the machine with certain parts broken away in order more clearly to reveal the nature of the invention;

FIG. 9 is a schematic side elevational view showing the working area of the machine at the commencement of the machine cycle;

FIG. 10 is a schematic view similar to FIG. 9 but with the pattern plate in position immediately prior to the flask-clamping operations;

FIG. 11 is a schematic view similar to FIG. 9 but showing the parts in the position which they assume during the clamping and blowing operation;

FIG. 12 is a side elevational view of the structure shown in FIG. 11;

FIG. 13 is a schematic view similar to FIG. 9 but showing the parts of the improved sand mold-forming machine in the positions which they assume during the sand-squeezing operation;

FIG. 14 is a schematic view similar to FIG. 9 but showing the parts of the machine in the positions which they assume during pattern-drawing operations;

FIG. 15 is a schematic view similar to FIG. 14 but showing the patern plate withdrawn from the working area of the machine;

FIG. 16 is a schematic view showing the cope and drag mold sections of the machine closed upon each other immediately prior to the push-out operation;

FIG. 17 is a schematic view similar to FIG. 16 but showing the parts of the machine in the positions which they assume at the commencement of the push-out operation; and FIG. 18 is a schematic view similar to FIG. 17 but showing the machine parts in the positions which they assume at the completion of the push-out operation and immediately prior to commencement of another machine cycle.

BRIEF DESCRIPTION OF THE MACHINE

Figure 5:
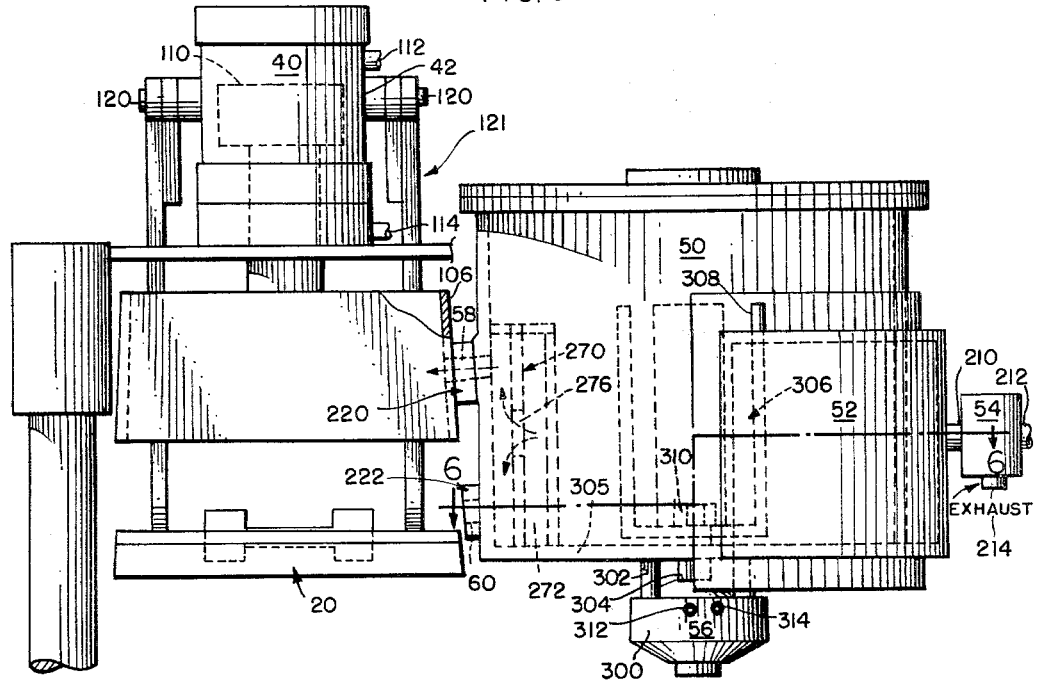
FIG. 5 is an enlarged side elevational view of the upper portion of the machine in the vicinity of the sand magazine.

Referring now to the drawings in detail, and in particular to FIGS. 1 to 8, inclusive, one exemplary form of an automatic sand mold-making or forming machine constructed in accordance with the principles of the present invention has been designated in its entirety by the reference numeral 10. This machine is shown in the drawings as being positioned upon a foundary floor 12 or other supporting surface.

Briefly, the sand mold-forming machine of the present invention involves in its general organization an upper fixed cope flask section 16, a lower movable drag flask section 18, and a two-sided movable pattern or match plate 20 for supporting upper and lower patterns 22 and 24, together with mechanism for handling the two flask sections and the match plate in a cyclic manner to the end that the empty flask sections may first be brought into operative engagement with the match plate by a clamping operation, the two flask sections filled with said simultaneously by a blowing operation, the two flask sections 16 and 18 compacted about the patterns 22 and 24 by a simultaneous squeeze operation, the flask sections separated from the match plate by a pattern draw operation to release the match plate and its affixed patterns, the match plate removed from the working area of the machine, the flask sections 16 and 18 brought together to effect a mold section-closing operation, the mold sections withdrawn in their closed condition from the flask sections by a push-out operation, and the match plate returned to its initial position in the working area of the machine preparatory to the next machine cycle. The operation of the machine is repetitive, each machine cycle serving to produce a complete composite sand mold including upper and lower mold sections closed upon each other and ready for a metal-pouring operation.

Most of the machine movements briefly outlined above are in-line vertical movements and take place along a vertical axis extending through the working area of the machine, this area being designated by the reference letter W. The upper cope flask section 16 is stationary or fixed on the machine framework, while the lower drag flask section 18 is vertically shiftable under the control of a vertically movable lift table in the form of an assembly of parts including a lower squeeze plate 26, a plurality of vertically extending combined lift and stop brackets 28 and a series of four vertically disposed elongated lift cylinders 30. The bracket 28 is fixedly secured to the lower squeeze plate 26. The cylinders 30 are suspended from the underneath sides of the combined lift and stop brackets 28 and have plungers 32 associated therewith. The three aforementioned instrumentalities, namely, the lower squeeze plate 26, the brackets 28, and the cylinders 30, move bodily in unison in a vertical direction and constitute what is termed herein the lift table. The lower drag flask section 18 is supported on and carried by the lift table during a major portion of the machine cycle, but it is adapted to be separated from the table vertically at two times during each machine cycle. Such separation takes place, first, during the blow operation when the flask section 18 is clamped to the match plate 20 as shown in FIG. 11, and secondly, it takes place toward the end of the machine cycle during the push-out operation as shown in FIGS. 17 and 18. The separation is effected under the control of the four lift cylinders 30 by means of the plungers 32, the upper ends of which are secured to the lower drag flask section 18. Such plungers serve to push the lower drag flask section 18 away from its support on the lift and stop brackets 28 at this time in the machine cycle for purposes that will be made clear presently.

The entire lift table, including the lower squeeze plate 26, the brackets 28, and the cylinders 30, are movable vertically under the control of a lower arm 34 in the form of an assembly including a vertical ram cylinder 36 and a vertical ram plunger 38, the upper end of the ram plunger being suitably and fixedly secured directly to the central portion of the lower squeeze plate 26. An upper ram 40 in the form of a vertical ram cylinder 42 and a vertical ram plunger 44 serves to actuate an upper squeeze plate 46 to which the lower end of the plunger 44 is connected centrally thereof. The upper and lower squeeze plates 46 and 26 are movable into and out of the upper cope flask section 16 and the lower drag flask section 18 respectively in the usual manner of operation of such squeeze plates during the squeeze operation of the machine. The upper squeeze plate 46 is also movable into the upper cope flask section 16 for sand mold push-out purposes during the push-out operation to eject both the cope and drag mold sections from their respective flask sections in a manner that will likewise be made clear subsequently.

During the clamping and blowing operations, the lower ram 34 maintains the cope and drag flask sections 16 and 18, with the match plate 20 sandwiched between them, in operative register with a fixed sand magazine 50 which is positioned at one side of the working area W, and during the blow operation, air is admitted to the sand magazine from an air distribution manifold 52 under the control of a blow valve 54, while at the same time, sand in the magazine 50 is agitated by an agitator mechanism 56 so that the sand within the magazine will be forced through blow openings 58 and 60 which are associated with the magazine and with which cooperating blow slots 62 and 64 in associated relation with the flask sections 16 and 18 respectively are maintained in sealing register during the blow operation.

To a certain extent, the novelty of the present invention resides in the disposition of the moving machine parts in the working area W of the machine, in the manner of placement of the match plate into this area and its withdrawal therefrom at appropriate times in the machine cycle, in the simultaneous cooperation of the sand magazine with the upper and lower flask sections 16 and 18 during the blow operation so that both flask sections on opposite sides of the match plate 20 may be filled with sand while equalizing the pressure on the match plate from above and below, in the simultaneous operation of the squeeze plates 46 and 26 to compact the sand about the upper and lower patterns 22 and 24 with equal pressure being applied to the match plate on opposite sides thereof, and in the single push-out operation for both completed mold sections which leave the flask sections closed upon each other and ready for a molten metal-pouring operation. A certain amount of novelty resides also in the nature and construction of the sand magazine 50 and the agitator mechanism 56 therefor and, in addition, the association of the agitator with the air distribution manifold 52 and blow valve 54.

THE MACHINE FRAMEWORK

Referring now specifically to FIGS. 1 and 2, the stationary framework of the machine includes a base plate 70 which may be bolted or otherwise secured to the foundary floor 12 and from which there projects upwardly a series of four vertically disposed supporting posts 72. At their upper ends, the supporting posts 72 carry respective or individual rectangular blocks 74, the two blocks at the front of the machine being connected together by a channel member 76, and the two blocks at the rear of the machine being connected together by a channel member 78. A horizontal plate 80 extends between the channel members 76 and 78 at the upper edges thereof and serves to support thereon the upper ram cylinder 42. The upper cope flask section 16 is fixedly carried in the machine framework, but is capable of being removed therefrom for purposes of replacement if desired. Accordingly, this flask section is supported on lugs 82 which are connected by bolts 84 to the channel members 76 and 78. The lower ram cylinder 36 is supported on the base plate 70 of the machine framework and is centered in a spacer plate 86 which is carried on the supporting posts 72. Front and rear channels 88 and 90 extend between adjacent supporting posts 72 and complete the disclosed portion of the stationary machine framework. The sand magazine 50 and its associated air distribution manifold 52, as well as the blow valve 54, constitute functional elements of the present machine, but the supporting structure whereby the sand magazine is fixedly positioned at one side of the working area W has not been illustrated herein in its entirety, it being understood that the sand magazine may be supported suitably from the base plate 70 or supported directly from the foundry floor 12. Suitable brackets, one of which has been shown at 92, may be provided as a reinforcement support for the magazine, the bracket serving to attach the magazine to the front and rear posts 72 at one side of the machine. Other functional stationary portions of the machine framework have been omitted from the disclosure herein in the interests of clarity, the illustrated portions being sufficient to establish a reaction support for all of the movable machine elements or parts that are associated with the machine. In this respect, the disclosures of FIGS. 1 and 2 are, to a certain extent, schematic disclosures.

THE UPPER COPE FLASK SECTION AND ITS OPERATING INSTRUMENTALITIES

*The cope flask section proper*

As best seen in FIGS. 2, 3, and 4, the upper cope flask section 16 is in the form of an open-ended, box-like, generally rectangular structure having front and rear walls 100 and 102 and side walls 104 and 106. The upper and lower ends of the box-like structure are open. In the upper region of the flask section 16, the inside wall surfaces are vertical as indicated at 108 for proper sealing cooperation with the upper squeeze plate 46 which moves downwardly into the flask section 16 during the squeeze operation as well as during the push-out operation. The previously mentioned blow slot 62 is formed in the side wall 106 at a region substantially midway between the upper and lower rims of the open-ended structure that constitutes the flask section 16. The blow slot 62 extends horizontally across the wall 106 as best seen in FIG. 4 and is almost coextensive with the horizontal span of this wall. The lower open rectangular rim of the upper cope flask section 16 is adapted to seat upon the peripheral regions of the upper face of the match plate 20 as shown in FIG. 3, this seating remaining effective during the clamping and blowing operations (see FIGS. 11 and 12) and during the squeeze operation (see FIG. 13). The rectangular box-like structure which constitutes the upper cope flask section 16, in combination with the upper squeeze plate 46 and the match plate 20, defines an interior flask cavity which encompasses the upper pattern 22. As will be described in greater detail presently, the inclination of the walls 100, 102, 104 and 106 of the flask section 16 and the constant slight taper which is thus afforded to the flask section as a whole facilitates registry of the blow slot 62 in the wall 106 with the blow opening 58 which is associated with the sand magazine 50. This taper also facilitates the push-out operation when the upper squeeze plate 46 descends into the flask cavity. The side walls 104 and 106 of the upper cope flask section 16 are provided with laterally extending alignment ears 109 which underlie and bear against the channel members 76 and 78. These ears have formed therein holes 111 which register vertically with alignment pins 113 which are carried by the match plate 20 and cooperate therewith during the blow and squeeze operations for maintaining the flask sections 16 and 18, and the match plate 20 in accurate vertical register.

The upper ram assembly

The cylinder 42 of the upper ram 40, being fixedly carried or mounted on the plate 80, constitutes a fixed element of the machine. The ram plunger 44 of the upper ram has its upper end connected to a piston 110 which operates within the upper ram cylinder 42. The lower end of the plunger 44 is pivotably fixedly connected to the central portion of the upper squeeze plate 46. Ports 112 and 114 are formed in the end portions of the ram cylinder 42 and serve selectively to admit fluid under pressure into the upper and lower ends of the cylinder interior in order to effect actuation of the piston 110 and its associated movable structure. As best seen in FIGS. 3, 4 and 5, when the piston 110 is in its uppermost position, the upper squeeze plate 46 projects just within the upper open rim of the upper cope flask section 16 and cooperates with the vertical surfaces 108 to close the upper end of the flask section so that the size or capacity of the flask cavity is at a maximum. When fluid under pressure is supplied to the upper ram cylinder 42 through the port 112 to drive the piston 110 downwardly during the squeeze operation (see FIG. 13), the squeeze plate 46 moves downwardly in the flask section 16 to the position wherein it is shown in FIG. 13 and results in compacting of the sand which has been blown into the flask cavity during the previous blow operation, all in a manner that will be set forth in detail subsequently.

The cylindrical side wall of the upper ram cylinder 42 has fixed thereto a pair of diametrically disposed trunnions 120, these trunnions constituting pivotal supports for an extensible match plate frame assembly 121 by means of which the match plate 46 may be swung into and out of operating position in the working area W in a manner that likewise will be made clear presently.

THE LOWER DRAG FLASK SECTION AND ITS OPERATING INSTRUMENTALITIES

The drag flask section proper

Referring now to FIGS. 1 to 4, inclusive, the lower drag flask section proper 18 is in the form of an open-ended generally rectangular box-like structure including front and rear walls 122 and 124 and side walls 126 and 128. In the lower region of the flask section 18, the inside wall surfaces are relieved and are vertical as indicated at 129 for proper sealing cooperation with the lower squeeze plate 26 which moves upwardly into the flask section 18 during the squeeze operation. The previously mentioned blow slot 64 is formed in the side wall 128 of the flask section 18 at a region substantially midway between the upper and lower rims of the open-ended structure that constitutes said flask section 18. The blow slot 64 extends horizontally across the side wall 128 as best seen in FIG. 4 and is almost coextensive with the horizontal span of such wall. The upper open rim of the lower drag flask section 18 is designed for sealing engagement with the match plate 20 during the blow and squeeze operations as shown in FIGS. 11 and 13.

The lower ram assembly

The previously mentioned ram plunger 38 of the lower ram 34 has its lower end operatively connected to a piston 130 which is vertically slidable within the ram cylinder 36. The upper end of the ram plunger 38 is fixedly connected to the central portion of the lower squeeze plate 36 and serves to support said squeeze plate. Fluid ports 132 and 134 are formed in the upper and lower ends of the ram cylinder 36 and are for the purpose of selectively admitting fluid under pressure to the ends of the cylinder interior in order to actuate the piston and thereby effect raising and lowering of the squeeze plate 26 and, consequently, the entire lift table including said lower squeeze plate, the lift and stop brackets 28, and their associated four lift cylinders 30. The lift and stop brackets 28 depend from the four corner regions of the lower squeeze plate 26 and project laterally outwardly thereof. The cylinders 30 depend from the respective combined lift and stop brackets 28, and in the lowermost position of the lift table, the lower end regions of the cylinders project through the aforementioned spacer plate 86 as best seen in FIGS. 1 and 2. In the raised position of the lift table when the flask sections 16 and 18 are closed upon the match plate 20 during the blow operation as shown in FIG. 11, or when the push-out operation takes place as shown in FIG. 17, these cylinders 30 lie wholly above the level of the spacer plate 86. The cylinders 30 are provided at the lower ends thereof with fluid ports 140 for admission of fluid under pressure to the cylinders to drive or force the plungers 32 of the lift cylinders 30 upwardly at appropriate times in the machine cycle. The upper ends of the plungers 32 are connected to the lower drag flask section 18 by means of attachment ears 142 on the side walls 122 and 124 of said flask sections.

The side walls 122 and 124 of the flask section 18 are formed with laterally extending alignment ears 144. The latter are similar in design and function to the ears 109 on the side walls 104 and 106 of the upper cope flask section 16, and are designed for cooperation with the alignment pins 113 on the match plate 20 during the blow operation.

THE MATCH PLATE ASSEMBLY

The pattern plate proper

The match plate proper is comprised of two principal parts, namely, a plate portion 150 in the form of a rectangular flat plate, and a generally rectangular frame portion 152 which depends from the peripheral region of the plate portion and includes front and rear frame bars 154 and 156, and side frame bars 158 and 160, the various bars being anchored to the plate portion 150 by means of screws 162. The match plate 20 is thus of inverted shallow tray-like design and the side walls thereof which are formed by the bars 154, 156 and 158 and 160 are inclined or tapered to conform to the inclination or taper of the various walls of the lower drag flask section 18 to the end that when the match plate 20 and the lower drag flask section 18 are in sealing engagement with each other as shown in FIGS. 3, 4 and 11, the depending rectangular frame portion 152 of the match plate, in effect, constitutes an upper extension of the flask section 18, and during the blow operation, the cavity which is to be filled with sand is defined by the walls of the flask section 18 and the various bars of the depending frame portion 152, in combination with the plate portion 150 and the lower squeeze plate 26, the parts assuming the position in which they are shown in FIGS. 3, 4 and 11.

For exemplary purposes, the upper pattern 22 which is suitably secured to the upper face of the plate portion 150 is shown as being in the form of an automotive-connecting rod section. The lower pattern 24 is in the form of a counterpart connecting rod section and is suitably secured to the lower face of the plate portion 150.

Oppositely extending ears 164 on the side bars 158 and 160 of the frame portion 152 of the match plate 20 carry the previously-mentioned alignment pins 113, these pins extending vertically and being adapted to enter the holes 111 in the ears 109 on the upper cope flask section 16 and the holes 146 in the ears 144 on the lower drag flask section 18 when the two flask sections are clamped against the match plate 20 during the blow and squeeze operations as shown in FIG. 4.

The supporting frame for the match plate

The match plate 20 is carried at the lower end of the previously-mentioned pivotally mounted frame 121, this frame being of an extensible and contractible (telescopic) nature to allow for vertical shifting movements of the match plate 20 when the latter is in the working area W of the machine. The frame 121 includes two side assemblies which are substantially identical in construction so that a description of one of them will suffice for the other. Each side assembly comprises an L-shaped arm 170 in the form of a short foot portion 172 and an upstanding leg portion 174. The distal end of the short foot portion is secured to the rear bar 156 (see FIG. 4) of the depending portion 152 of the match plate 20. The arm 170 is designed for cooperation with a counterpart arm 176 (see FIG. 2) including a short foot portion 178 which is slidably and telescopically received in a socket 180 in the upper end of the leg portion 174 of the arm 170. The arm 176 also includes a normally horizontal leg portion 181, the proximate end of which is pivotally connected for swinging movements to one of the trunnions 120 on the upper ram cylinder 42. A pin and slot connection 182 maintains the foot portion 178 captured within the socket 180 and the two pin and slot connections on each side of the frame limit the extended position of the frame.

The frame 121 is movable bodily as a unit back and forth between the retracted elevated out-of-the-way position in which it is shown in dotted lines in FIG. 2 and full lines in FIG. 9, and the advanced lowered position in which it is shown in full lines in FIGS. 2 and 10. When the frame 121 is swung into its advanced position, the match plate 20 is projected horizontally into the working area of the machine between the upper and lower flask sections 16 and 18. In this latter position, the weight of the match plate and its associated parts maintains the frame in its fully extended position, and this extended position of the frame determines the lowermost position of the match plate. At the commencement of the clamping operation, as the table including the lower squeeze plate 26, the brackets 28, and the lift cylinders 30 move bodily upwards as a unit under the influence of the lower ram 34, the upper edge or rim of the lower flask section 18 engages the lower rim of the depending portion 152 of the match plate 20 and carries the entire match plate bodily upwards, thus telescoping or retracting the frame 121 and bringing the parts to the positions wherein they are shown in FIG. 11.

The actuator for the match plate frame

In order to swing the match plate frame 121 back and forth between its advanced and retracted positions, a cylinder and plunger assembly 190 is provided. This assembly comprises a vertically extending cylinder 192, and a cooperating plunger 196. The lower end of the cylinder 192 is pivotally connected to an ear 194 on the channel member 78. The upper end of the plunger is pivoted as at 198 to the leg portion 181 of one of the arms 176. A fluid port 199 at the lower end of the cylinder 192 is provided for the purpose of admitting fluid under pressure to the cylinder in order to extend the plunger 196 and cause the frame 121 to be swung to its retracted position as shown in dotted lines in FIG. 2. Retraction of the plunger 196 into the cylinder 192 takes place under the influence of the inherent weight of the frame.

THE SAND MAGAZINE ASSEMBLY

The essential elements of the sand magazine assembly are the previously-mentioned sand magazine proper 50, the air distribution manifold 52, the blow valve 54 and the agitator mechanism 56. These elements or instrumentalities are assembled upon one another and may, as previously stated, be supported in any suitable manner from the base plate 20 or the foundry floor by way of structural members which have not been disclosed herein or may be secured by the brackets 92 to certain of the vertical supporting posts 72. The sand magazine 50 is generally of cylindrical design and comprises a continuous cylindrical side wall 200, the rear region of which is provided with a thickened portion 202 having a circumferential extent of slightly less than 180°. The thickened side wall portion 202 is provided with a multiplicity of radial sand entrance ports 204 which establish communication between the interior of the sand magazine and the interior of the air distribution manifold 52. A curved sand screen 205 embraces all of the ports 204 and closely hugs the cylindrical side wall 200 of the magazine and serves to prevent egress of sand during exhaustion of the magazine.

The air distribution manifold 52 is in the form of a curved plate which closely hubs the thickened portion 202 of the side wall 200 but which is spaced a slight distance therefrom and, in combination with said thickened side wall portion, establishes a partial annulus which embraces the rear portion of the sand magazine 50 and provides an air chamber.

The blow valve 54 is in the form of a three-way valve structure having an outlet leg 210 in communication with the chamber 206, an inlet leg 212 for the admission of air under pressure, and a bleeder leg 214 in communication with the atmosphere.

The blow plate assemblies

Figure 7:
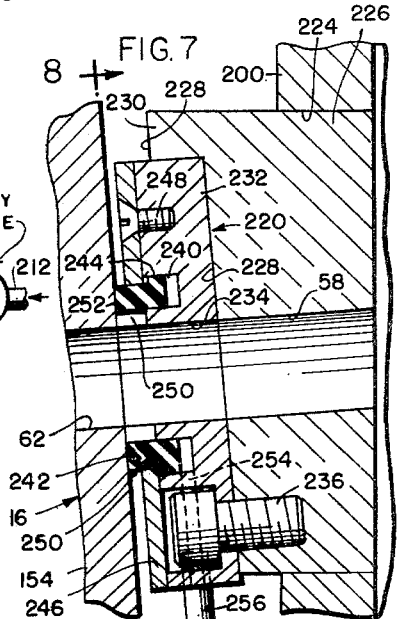
FIG. 7 is a sectional view taken on the line 7—7 of FIG. 6.
Figure 8:
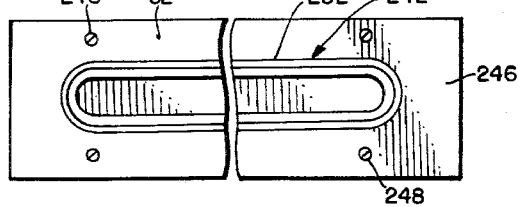
FIG. 8 is a sectional view taken on the line 8—8 of FIG. 7.

At the forward side of the sand magazine 50, the previously-mentioned upper and lower blow openings 58 and 60 are established by reason of a pair of identical blow plate assemblies which have been designated at 220 and 222, respectively. The blow plate assembly 220 is disposed above the assembly 222. It has been illustrated in detail in FIG. 7, and a description of it will suffice for the other blow plate assembly, namely, assembly 222. The cylindrical side wall 200 of the sand magazine 50 is provided with an opening 224. Within this opening there is mounted a block 226, the front face 228 of which is inclined at a small angle to the vertical. The upper blow opening 58 extends through the block 226. Seated against the inclined front face 228 and disposed directly beneath a forwardly projecting reinforcing flange 230 is a blow plate 232 having formed therein a blow opening 234 in register with the upper blow opening 58. The blow plate 232 is secured by screws 236 to the inclined front face 228 of the block 226. The front or forward face of the blow plate 232 is provided with a continuous groove 240, such groove being in the form of an elongated loop conforming in shape to the shape of the blow slot 62 in the wall 154 of the upper flask section 16. The groove 240 encircles the elongated blow opening 234 and has a transverse width, i.e., a vertical dimension, slightly greater than the vertical dimension of the blow slot 62. It also has a longitudinal dimension slightly longer than the longitudinal dimension of the blow slot 62. Slidably disposed within the groove 240 is a resilient sealing strip 242 which may be formed of rubber or other suitable elastomeric material and is in the form of a continuous loop. The inner region of the sealing strip 242 is formed with a lateral flange 244, and a retaining plate 246 which is secured by screws 248 to the front face of the blow plate 232 is formed with an elongated slot 250. The edges of the 250 slightly overhang the outer perimeter of the groove 240, the overhanging portion being designed for engagement with the flange 244 to capture the sealing strip 242 within the slot 244 and prevent its removal therefrom. The sealing strip 242 projects outwardly of the groove 240 and through the opening 250, thus affording a continuous flexible sealing lip 252 which is designed for sealing engagement with the outer face of the side wall 154 of the upper flask section 16 when the latter is in its raised position during the blow operation as shown in FIGS. 7, 11 and 12. When thus in sealing engagement with the side wall 154, the sealing lip 252 encompasses the blow slot 62. In order to insure effective sealing contact between the flexible sealing lip 252 and the outer face of the side wall 154 of the upper flask section 16, means are provided for introducing air into the blow slot 240 behind the elastomeric sealing strip 242 and, accordingly, an air passage 254 extends through the blow plate 232 and establishes communication between the groove 240 and a supply line 256 for air under pressure. Air under pressure is delivered to the groove 240 immediately after the flask sections have been brought into clamping engagement with the match plate and immediately prior to the blow operation, such pressure being maintained only until such time as the blow operation has been completed.

*The sand distribution box*

In order to equalize the distribution of sand flowing between the upper and lower blow plate assemblies 220 and 222, a terminal sand and air distribution box 270 (see FIGS. 5 and 6) establishes a sand and air distribution chamber 272 in the vicinity of and common to both blow plate assemblies 220 and 222, the two blow openings 58 and 60 being in communication with this chamber. The rear curved wall 274 of the distribution box 270 is provided with an elongated slot 276 at a level midway between the respective levels of the two blow openings 58 and 60. Sand entering the sand and air distribution box 270 through the inlet holes 276 is constrained to flow in divided paths as indicated by the arrows in FIG. 5. In the absence of the sand and air distribution box 270, a certain amount of sand settling at regions remote from the agitator assembly 56 would tend to cause a greater quantity of sand to pass to the lower blow opening 60 than would be passed to the upper blow opening 58. The provision of the sand and air distribution box 270 eliminates this tendency for unequal sand distribution.

*The agitator mechanism*

Figure 6:
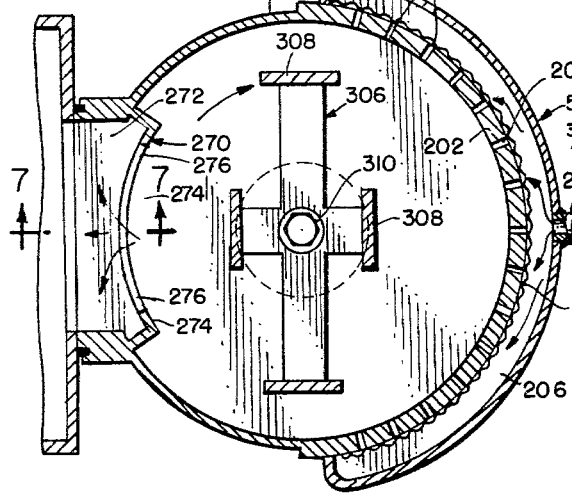
FIG. 6 is a sectional view taken on the line 6—6 of FIG. 5.

Referring now to FIGS. 5 and 6, the previously-mentioned agitator mechanism 56 includes a motor 300 which is suspended from the bottom wall 305 of the sand magazine 50 by vertically-arranged suspension posts 302. The armature shaft 304 of the motor 300 projects upwardly through said bottom wall of the sand magazine 50 and carries a sand agitator 306. The agitator 306 is in the form of a spider having upwardly-projecting agitating arms 308 associated therewith, these arms extending an appreciable distance upwardly into the chamber of the sand magazine. The agitator 306 is secured to the upper end of the motor shaft 304 by a clamping nut 310. Two of the arms 308 are spaced from the central axis of the spider on a short radius as shown in FIG. 6, while the two other arms 308 are spaced from this axis on a longer radius so that collectively the arms operate in different regions of the chamber within the sand magazine 50. The motor 56 is preferably of the fluid-actuated oscillatory vane-type and, accordingly, is provided with fluid ports 312 and 314 for admission thereto of actuating fluid under pressure.

OPERATION OF THE MACHINE

The operation of the machine has been schematically illustrated in FIGS. 9 to 18, inclusive. In these views, substantially all of the machine framework has been omitted in the interests of clarity, as has also the sand magazine and its associated parts. In FIG. 12, however, where the blow operation is illustrated, a small fragment of the sand magazine appears so as to illustrate the relative positions of, and the cooperation between, the cope and drag flask sections 16 and 18 and their associated blow plate assemblies 220 and 222 with which they cooperate only at this point in the machine cycle. Additionally, in these views, all of which are similar in their mode of representation, certain elements appear but once or twice in the early views of the group of schematic views to illustrate their relationship or function, and are omitted from the subsequent views in the interests of clarity.

*The start position*

The starting position of the machine at the commencement of the machine cycle has been illustrated in FIG. 9. The ram plunger 38 is maintained in its lowermost position so that the entire table, including the lower squeeze plate, the lift and stop brackets 28 and the cylinders 30, is in its down position. A predetermined amount of fluid under pressure is admitted to the cylinders 30 through plungers 32, which are associated with the four cylinders 30, are slightly projected from the cylinders to hold the lower drag flask section 18 in a lowered position with the lower rim thereof in horizontal register with the lower squeeze plate 26 and with the latter projecting partially into the confines of the wear plate 131 so that the parts assume the positions in which they are illustrated in FIG. 4. Fluid is applied to the cylinder 192 through the port 140 to maintain the associated plunger 196 in its extended position so that the match plate frame 121 is in its elevated position and so that the match plate is maintained in an out-of-the-way postion remote from the working area W of the machine.

*Pattern plate projection*

At the commencement of the machine cycle, the cylinder 192 is actuated (see FIG. 2) and the match plate frame 121 is thus caused to move to its lowered position, thus projecting the match plate 20 into the working area W of the machine and in vertical register with the cope and drag flask sections 16 and 18 so that the parts assume the postions in which they are shown in FIGS. 2 and 10. The table, including the lower squeeze plate 26, the brackets 28 and lift cylinders 30, remains in its down position undisturbed from the position in which it is shown in FIG. 9. The upper squeeze plate 46 likewise remains undisturbed.

*The clamping operation*

As soon as the match plate 20 is in position within the working area W of the machine as shown in FIG. 10, fluid under pressure is applied to the lower ram cylinder 36 through the port 34 to project upwards the piston 38 and cause the lift table, including the lower squeeze plate 26, the brackets 28, and the lift cylinders 30, to move bodily upwardly, thus carrying the lower flask section 18 upwardly so that the upper rim thereof engages the lower open rim of the depending portion 152 of the match plate 20, thus establisihng the flask cavity beneath the match plate proper 150. The cylinder ports 140 and 142 remain cut off so that the predetermined quantity of fluid previously admitted to the lift cylinders 30 remains effective to force the attachment ears 142 and, consequently, the lower flask section 18, bodily upwardly so that the relative positions of the lower squeeze plate 26 and the lower rim of the lower flask section 18 are not altered during the rise of the lift table.

As soon as the upper rim of the lower flask section 18 engages the match plate 20, the match plate is carried upwardly under the influence of the rising table, and during such upward movement, the arms 170 and 176 of the match plate frame 121 are telescoped as previously described, and the upper face of the match plate proper 150 is brought into engagement with the lower rim of the upper flask section 16, thus establishing the flask cavity above the match plate. The pressure of trapped fluid in the lower rim cylinder 36 and full operating pressure in the four lift cylinders 30 serves to effect the clamping operation wherein both flask sections 16 and 18 are clamped tightly against the match plate 20 and the parts assume the positions wherein they are illustrated in FIGS. 3, 4 and 11.

*The blow operations*

After the two flask sections 16 and 18 have been clamped against the match plate 20 as described above and while fluid pressure is maintained in the cylinders 30, the blow operation is effected. This blow operation takes place upon manipulation of the blow valve 54 (see FIGS. 5 and 6) so that air is admitted to the interior of the air distribution manifold 52 through the outlet leg 210 of the valve. Air thus admitted to the manifold 52 is directed radially into the interior of the sand magazine 50 over a wide angle, the air passing through the curved screen 205 and the radial ports 204. During such admission of air to the sand magazine, fluid is alternately admitted to the ports 312 and 314 of the motor 300 of the agitator assembly 56 and a relatively slow but powerful oscillatory motion is applied to the sand agitator proper 306.

The airborne sand passing through the sand inlet openings 276 of the sand distribution box 270 spreads outwardly in all directions as indicated by the arrows in FIGS. 5 and 6 and is equally and substantially uniformly distributed to the blow openings 58 of the blow plates of the upper and lower blow plate assemblies 220 and 222.

Air under pressure is maintained effective against the inner faces of the sealing strips 242 (see FIG. 7) of the upper and lower blow plate assemblies 220 and 222 by the admission of such air to the continuous grooves 240 through the air lines 256 and thus the flexible sealing lips 252 are maintained in sealing engagement with the outside faces of the respective side walls 106 and 128 and around the blow slots 62 and 64.

It is to be noted at this point that the sealing strip 242 of the lower blow plate assembly 222 becomes effective automatically at the time that the lower flask section 18 moves into position thereagainst. The previously-mentioned slight inclination of the side wall 128 of the lower flask section 18, coupled with the truly vertical rise of the lower flask section during the clamping operation, brings the blow slot 58 into the horizontal confines of the sealing strip 242 and, thereafter, by a camming action against the outside face of the side wall 128 of the flask section 18, the sealing strip 242 is caused to yield against the action of fluid pressure in the continuous groove 240 until the desired air-tight seal is established between the blow plate and the lower flask section 18.

The sand which is carried into the cavities of the upper and lower flask sections 16 and 18 is distributed about the upper and lower patterns 22 and 24 in the usual manner of sand distribution but in the present instance, since equal air pressure is maintained in the two cavities above and below the match plate proper 150, buckling or bulging of the match plate is effectively prevented and no reaction support for the match plate proper other than that afforded by the balanced distribution of air is necessary. Such balanced distribution of air on opposite sides of the match plate proper 150 constitutes one of the principal features of the present invention.

*The squeeze operation*

Another and important feature of the present invention resides in the simultaneous compacting of sand within the two flask cavities about the upper and lower patterns 22 and 24 on opposite sides of the match plate proper, thus again maintaining equalized pressure on both sides of the match plate. This squeeze operation has been schematically portrayed in FIG. 13.

After the blow operation has been completed and the cavities in the two flask sections 16 and 18 have been filled with sand, fluid pressure in the four cylinders 30 is relieved while full fluid pressure in the cylinder 36 of the lower ram 34 is applied, whereupon the plunger 38 moves upwardly and carries the lower squeeze plate further into the cavity of the lower flask section 18 to compact the sand about the lower pattern 24. At the same time, fluid is admitted to the cylinder 42 of the upper ram 40 to drive the plunger 44 downwardly and thus cause the upper squeeze plate 46 to enter the cavity in the upper flask section 16 and compact the sand therein about the pattern 22.

During these squeeze operations, equal squeeze pressure is maintained on opposite sides of the match plate proper 150 by admission of fluid through a common feed to the ports 112 and 134, and thus, bulging or warping of the plate in one direction or the other is avoided. It is to be noted at this point that although the squeeze operation is initiated by relieving the fluid pressure within the cylinders 30 so that full fluid pressure in the ram cylinder 36 may carry the lower squeeze plate 26 upwardly to effect the squeeze, as previously described, the tapered wall surfaces of the lower flask section 18 prevent falling of this flask section and full clamping pressure adequate to maintain sealing engagement between the upper rim of the flask section and the lower rim of the match plate 20 is maintained during the squeeze operation. This relief of fluid pressure within the four cylinders 30 is exemplified in FIG. 13 wherein it may be noted that the plungers 32 of the lift cylinders 30 are fully retracted within the cylinders so that they do not appear in this view. Depending upon the quantity of sand within the cavity in the lower flask section 18 and the degree to which the sand may be compacted therein, the combined lift and stop brackets 28 may or may not engage the lower rim of the lower flask section 18. Engagement of these brackets with the lower rim of the flask section 18 places a limit upon the degree of compacting pressure which may be applied to the sand within the flask cavity.

*The pattern draw operation*

To effect the pattern draw operation at the completion of the squeeze operation, the port 134 of the lower ram cylinder 36 is relieved and fluid is applied to the port 132 to retract the plunger 38 and lower the lift table bodily as a unit. Fluid pressure within the cylinders 30 remains relieved so that the plungers 32 remain retracted. Thus, the lower flask section 18 descends with the table and the compacted sand mold section within the lower flask cavity also descends with the lower flask section. The compacted sand mold section in the lower flask section 18 has been designated at 400 in FIG. 14.

During such descent of the lift table, the match plate 20 also moves downwardly until such time as the pin and slot connections 182 (see FIG. 2) of the telescopic match plate frame 121 prevent further descent of the match plate. At this time, the lower flask section 18, together with its compacted sand content or mold section 400, separates from the match plate 20 and moves downwardly with the lift table until the parts assume the positions in which they are shown in FIG. 14. It is to be noted at this point that a small portion or head 402 of the compacted sand mold section 400 projects upwardly above the level of the upper rim of the lower flask section 18, this portion of the mold being that portion which was encompassed by the four bars 154, 156, 158 and 160 of the depending portion 152 of the match plate 20, such bars having now become separated from the sand mold section in the lower flask section 18.

Additionally, during such descent of the lift table, the compacted upper sand mold section 404 remains intact within the upper cope flask section 16. The patterns 22 and 24 are thus freed from their respective sand mold sections 400 and 404 and the match plate 20 with these patterns affixed thereto becomes suspended from the lowered and extended match plate frame 121 as shown in FIG. 14.

*Pattern plate retraction*

In order to remove the match plate 20 from the working area W of the machine, it is necessary merely to supply fluid under pressure to the port 199 of the cylinder 192 (see FIG. 2) to extend the plunger 196 and thus effect swinging movement of the match plate frame 121 in a counter-clockwise direction as shown in FIG. 15, thus causing the match plate 20 to move out of the working area W and assume the position wherein it is shown in this view. The condition of the upper ram 40 and of the lower ram 34, as well as of the cylinders 30, remains unchanged, the only machine movements involved being the movement of the match plate 20 and its supporting frame 121.

*The mold closing operation*

With the match plate 20 and the patterns 22 and 24 in the out-of-the-way position wherein they are illustrated in FIGS. 15 and 16, mold-closing operations, wherein the cope and drag mold sections 404 and 400, respectively, are brought together to produce the finished sand mold, are effected by raising the lift table to bring the lower or drag mold section 400 into engagement with the upper or cope mold section 404. This is accomplished by supplying fluid under pressure to the lower ram cylinder 36 through the port 134 to project the plunger 38 upwardly and raise the lift table. The cylinders 30 which move upwardly with the table remain relieved of fluid pressure so that the lower flask section 18 remains seated on the brackets 28 if the sand within the cavity has been sufficiently compacted to permit of such seating. Otherwise, the lower mold section 400 remains seated upon the head of sand which has been compacted within its confines. As shown in FIG. 16, the upwardly projecting exposed head of sand 402 which was compacted within the depending portion 152 of the match plate 20 engages the lower face of the compacted sand or mold section 404 within the upper flask section 16 at the time mold-closing operations are completed.

*The push-out operation*

The push-out operation has been schematically illustrated in FIGS. 17 and 18, the former view showing the commencement of the push-out operation of the latter view showing the completion of such operation.

The push-out operation is initiated by a simultaneous correlated movement of the various plungers which are respectively associated with the upper ram 40, the lower ram 34, and the four cylinders 30. Fluid under pressure is applied through the port 112 to the cylinder 42 of the upper ram 40 to drive the plunger 44 thereof downwardly, thus causing the upper squeeze plate 46 also to move downwardly and strip the compacted upper sand mold section 404 from the walls of the upper cope flask section 16 as shown in FIG. 17. At the same time that the upper squeeze plate 46 descends, controlled relief of fluid pressure in the cylinder 36 of the lower ram 34 allows the compacted lower sand mold section 400 to be stripped from the walls of the lower or drag flask section 18. This latter flask section 18 is maintained elevated by the reaction force offered by the plungers 32 of the four cylinders 30, a controlled application of fluid pressure to the lift cylinders 30 being effected to counteract the descent of the lift table which, otherwise, would cause a lowering of the lower flask section 18 together with the completed lower mold section 400 therein.

As the lift table reaches its lowermost position as shown in FIG. 18, the plungers 32 of the four cylinders 30 became substantially fully projected, and the closed mold including the cope and drag sections 404 and 400, now freed from the walls of their respective flask sections 16 and 18, descends with the table and remains at rest on the lower squeeze plate 26 with the latter, in turn, resting upon the combined lift and stop brackets 28.

It is to be noted at this point that inasmuch as both flask sections 16 and 18 remain elevated a substantial distance above the level of the superposed cope and drag sections 404 and 400 of the mold, the mold is accessible in its closed condition for manual removal from the machine. With the mold thus removed, the parts assume the position which they assumed at the commencement of the machine cycle, FIGS. 9 and 18 being substantially identical except for the presence of the completed and closed sand mold consisting of the sections 404, 400 in the latter view.

The operation of the machine is, of course, repetitive.

While one specific embodiment of a sand mold-forming machine constructed in accordance with the principles of the present invention has been shown and described herein for illustrative purposes, it will be understood that the illustrated form of the invention does not indicate all of the different forms of machines suitable for the functions intended; the form illustrated being only one of those which have been developed for commerical application. Therefore, the invention is not to be limited to the specific disclosed arrangement as various changes in the details of construction can be made without departing from the spirit or scope of the invention as defined in the accompanying claims.

Having thus described the invention what we claim as new and desire to secure by Letters Patent is:

1. In a sand mold-forming machine for the simultaneous production of cope and drag mold sections, a machine framework establishing a working area, a lift table, a lower drag flask section and an upper cope flask section disposed in said working area in superposed relationship in the order named, means fixedly and removably securing the upper cope flask section to the machine framework, a match plate mounted for lateral shifting movements in opposite directions between an advanced position wherein it is projected into the working area between the two flask sections and a retracted out-of-the-way position wherein it is remote from the working area, said match plate, when in its advanced position within the working area, being capable of limited vertical shifting movement between a lowered position wherein it is spaced from and disposed below the level of the upper cope flask section and a fully raised position wherein it engages the latter flask section, said lower drag flask section being supported upon the lift table and movable bodily therewith, said table being movable upwardly from a lowered position wherein the drag flask section thereon is spaced from and disposed below the level of the match plate, through an intermediate position wherein the drag flask section engages the match plate and raises the latter from its lowered position, to an elevated position wherein the drag flask section brings the match plate engaged thereby to its fully raised position of engagement with the cope flask section, said match plate, when in engagement with the cope and drag flask sections, defining in combination therewith upper and lower flask cavities respectively and on opposite sides of the match plate, each flask section including a side wall having a blow slot therein, and means operable when said table is in its elevated position for simultaneously introducing sand into said flask cavities through said blow slots.

2. In a sand mold-forming machine for the simultaneous production of cope and drag mold sections, a machine framework establishing a working area, a lift table, a lower drag flask section and an upper cope flask section disposed in said working area in superposed relationship in the order named, means fixedly and removably securing the upper cope flask section to the machine framework, a match plate mounted for lateral shifting movements in opposite directions between an advanced position wherein it is projected into the working area between the two flask sections and a retracted out-of-the-way position wherein it is remote from the working area, said match plate, when in its advanced position within the working area, being capable of limited vertical shifting movement between a lowered position wherein it is spaced from and disposed below the level of the upper cope flask section and a fully raised position wherein it engages the latter flask section, said lower drag flask section being supported upon the lift table and movable bodily therewith, said table being movable upwardly from a lowered position wherein the drag flask section thereon is spaced from and disposed below the level of the match plate, through an intermediate position wherein the drag flask section engages the match plate and raises the latter from its lowered position, to an elevated position wherein the drag flask section brings the match plate engaged thereby to its fully raised position of engagement with the cope flask section, said match plate, when in engagement with the cope and drag flask sections, defining in combination therewith upper and lower flask cavities respectively and on opposite sides of the match plate, each flask including a side wall having a blow slot therein, a sand magazine fixedly positioned adjacent to the working area of the machine and having a wall provided with an upper blow opening in register with the blow slot in the upper cope flask section and with a lower blow opening disposed at the horizonal level of the blow slot in the wall of the lower drag flask section when the latter is in its fully raised position, means automatically operable upon movement of the drag flask section to its raised position for establishing operative communication between the blow slot in the sidewall of the lower drag flask section and the lower blow opening, and a blow valve for admitting air under pressure to said sand magazine.

3. A sand mold-forming machine as set forth in claim 2 and wherein the side wall of the lower drag flask section is inclined forwardly and downwardly toward the sand magazine at a small angle from the vertical, said wall of the sand magazine is inclined rearwardly and downwardly at an angle commensurate with angle of inclination of said side wall, and said lower blow opening is normally disposed above and in vertical alignment with the blow slot in the wall of the lower drag flask section whereby, upon movement of the lower drag flask section to its fully raised position, the blow slot in the side wall thereof will move into communicating register with the lower blow opening.

4. A sand mold-forming machine as set forth in claim 2 and wherein said automatically operable means for establishing communication between the blow slot in the side wall of the lower drag flask section and the lower blow opening comprises a continuous elastomeric sealing strip surrounding the lower blow opening and having a rearwardly projecting flexible sealing lip which is yieldingly engageable with the rim region of the blow slot in the side wall of the lower cope flask section when the latter flask section moves toward its raised position.

5. A sand mold-forming machine as set forth in claim 4 and wherein the wall of the sand magazine is provided with a continuous groove therein encircling the lower blow opening, said sealing strip being slidably disposed in said groove with the flexible sealing lip thereof projecting rearwardly out of the groove, and means for supplying air under pressure to the interior of the groove between the bottom wall thereof and the sealing strip yieldingly to urge the latter rearwardly and maintain sealing pressure between the sealing lip and rim region of the blow opening in the side wall of the lower drag flask section.

6. In a sand mold-forming machine for the simultaneous production of cope and drag mold sections, a machine framework establishing a working area, a lift table, a lower drag flask section and an upper cope flask section disposed in said working area in superposed relationship in the order named, means fixedly and removably securing the upper cope flask section to the machine framework, a support pivotally connected to the framework above the level of the upper cope flask section, a match plate movably mounted on said support, said support being capable of arcuate swinging movement in opposite directions in a vertical plane between a lowered advanced position wherein the match plate is projected into the working area between the two flask sections and a retracted elevated out-of the-way position wherein the match plate is remote from the working area, said match plate, when in its advanced position within the working are, being capable of limited vertical shifting movement on the support between a lowered position wherein it is spaced from and disposed below the level of the upper cope flask section and a fully raised position wherein it engages the latter flask section, said lower drag flask section being supported upon the lift table and movable bodily therewith, said table being movable from a lowered position wherein the drag flask section thereon is spaced from and disposed below the level of the match plate, through an intermediate position wherein the drag flask section engages the match plate and raises the latter from its lowered position, to an elevated position wherein the drag flask section brings the match plate engaged thereby to its fully raised position, said match plate when in engagement with the cope and drag flask sections, defining in combination therewith upper and lower flask cavities respectively on opposite sides of the match plate, each flask section including a side wall having a blow slot therein, and means operable when said table is in its elevated position for simultaneously introducing sand into said flask cavities through said blow slots.

7. A sand mold-forming machine as set forth in claim 6 and wherein said support is in the form of an extensible and contractible frame including a proximate section pivotally connected to the framework and a distal section on which the match plate is mounted.

8. A sand mold-forming apparatus as set forth in claim 7 and wherein the pivotal connection for the proximate frame section is disposed above the level of the upper cope flask section, and wherein the swinging movements of the support take place in a vertical plane so that the match plate is projected bodily in a curved path into and out of the working area between lowered advanced and raised retracted positions respectively.

9. In a sand mold-forming machine for the simultaneous production of cope and drag mold sections, a machine framework establishing a working area, a lift table, a lower drag flask section and an upper cope flask section disposed in said working area in superposed relationship in the order named, means fixedly and removably securing the upper cope flask section to the machine framework, a match plate mounted for lateral shifting movements in opposite directions between an advanced position wherein it is projected into the working area between the two flask sections and a retracted out-of-the-way position wherein it is remote from the working area, said match plate, when in its advanced position within the working area, being capable of limited vertical shifting movement between a lowered position wherein it is spaced from and is disposed below the level of the upper cope flask section and a fully raised position wherein it engages the latter flask section, said lower drag flask section being supported upon the lift table and movable bodily therewith, said table being movable from a lowered position wherein the drag flask section thereon is spaced from and disposed below the level of the match plate, through an intermediate position wherein the drag flask section engages the match plate and raises the latter from its lowered position, to an elevated position wherein the drag flask section brings the match plate engaged thereby to its fully raised position, said match plate, when in engagement with the cope and drag flask sections, defining in combination therewith upper and lower flask cavities respectively on opposite sides of the match plate, each flask section including a side wall having a blow slot therein, means operable when said table is in its elevated position for simultaneously introducing sand into said flask cavities through said blow slots, said table including a lift bracket upon which the drag flask section normally is supported, a squeeze plate movable into the lower flask cavity and movable bodily with the lift bracket, and a fluid-actuated cylinder mounted on the lift bracket and having a lift plunger connected to the drag flask section for raising the latter vertically from the lift bracket, a fluid-actuated ram for moving said table, said cylinder and ram providing four stages of relative movement between the drag flask section, the cope flask section, the match plate and the squeeze plate and including a first stage where the drag flask section alone moves vertically to raise the same a predetermined distance from the lift bracket, a second stage where the drag flask section and the squeeze plate move conjointly together to bring the latter flask section into engagement with the match plate, a third stage where the drag flask section, the squeeze plate and the match plate move conjointly together to bring the match plate into engagement with the cope flask section, and a fourth stage where the squeeze plate alone moves vertically into the lower flask cavity.

10. A sand mold-forming machine as set forth in claim 9 and including, additionally, fluid-actuated means for shifting said match plate laterally between its advanced lowered position and its retracted position.

11. A sand mold-forming machine as set forth in claim 9 and including, additionally, a stop element on said lift bracket for determining the extent to which the squeeze plate may move into the lower flask cavity.

References Cited by the Examiner
UNITED STATES PATENTS

| | | | |
|---|---|---|---|
| 955,838 | 4/1910 | Allenson | 22—26 |
| 1,091,020 | 3/1914 | Ronceray | 22—26 |
| 1,291,996 | 1/1919 | Michele | 22—26 |
| 2,654,924 | 10/1953 | Wood et al. | 22—10 |
| 2,973,562 | 3/1961 | Miller | 22—36 |
| 3,096,547 | 7/1963 | Hunter et al. | 22—10 |

MARCUS U. LYONS, *Primary Examiner.*